(12) United States Patent
Han et al.

(10) Patent No.: US 6,515,415 B1
(45) Date of Patent: Feb. 4, 2003

(54) TRIODE CARBON NANOTUBE FIELD EMISSION DISPLAY USING BARRIER RIB STRUCTURE AND MANUFACTURING METHOD THEREOF

(75) Inventors: In-taek Han, Yongin (KR); Jong-min Kim, Seongnam (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/562,431

(22) Filed: May 1, 2000

(30) Foreign Application Priority Data

Feb. 15, 2000 (KR) .............................. 00-7116

(51) Int. Cl.[7] .............................................. H01J 19/00
(52) U.S. Cl. ...................... 313/496; 313/309; 313/336; 313/351; 313/292
(58) Field of Search ................. 313/309, 336, 313/351, 495, 496, 497, 292, 249, 252, 256, 257

(56) References Cited

U.S. PATENT DOCUMENTS 6,097,138 * 8/2000 Nakamoto .............. 313/336 X
6,339,281 * 1/2001 Lee et al. .................. 313/309

* cited by examiner

Primary Examiner—Ashok Patel
(74) Attorney, Agent, or Firm—Burns, Doane, Swecker & Mathis, L.L.P.

(57) ABSTRACT

A triode carbon nanotube field emission display (FED) using a barrier rib structure and a manufacturing method thereof are provided. In a triode carbon nanotube FED employing barrier ribs, barrier ribs are formed on cathode lines by a screen printing method, a mesh structure is mounted on the barrier ribs, and a spacer is inserted between the barrier ribs through slots of the mesh structure, thereby stably fixing the mesh structure and the spacer within a FED panel due to support by the barrier ribs.

8 Claims, 11 Drawing Sheets

TRIODE CARBON NANOTUBE FIELD EMISSION DISPLAY USING BARRIER RIB STRUCTURE AND MANUFACTURING METHOD THEREOF

The following is based on Korean Patent Application No. 00-7116 filed Feb. 15, 2000, herein incorporated by reference.

BACKGROUND OF THE INVENTION

1. Field of the Invention

The present invention relates to a triode carbon nanotube field emission display using a barrier rib structure and a manufacturing method thereof.

2. Description of the Related Art

FIG. 1 is a sectional view schematically showing the structure of a conventional field emission display (FED). Referring to FIG. 1, the conventional FED includes transparent front and rear substrates 5 and 1 with a spacer 8 therebetween for separating the front and rear substrates 5 and 1 by a predetermined gap. Cathodes 2 are formed on the rear substrate 1 in a striped pattern. An insulating layer 3 is formed on the cathodes 2. Gates 4 are formed on the insulating layer 3 in a striped pattern crossing the cathodes 2. Holes 3' are formed in the insulating layer 3 on the cathodes 2. Microtips 2' for emitting electrons are formed on the cathodes 2 exposed by the holes 3'. The gates 4 are provided with opening portions 4' corresponding to the holes 3' so as to allow the electrons from the microtips 2' to be emitted to anodes 6. The anodes 6 are formed on the surface of the front substrate 5 facing the rear substrate 1 in a striped pattern crossing the cathodes 2. The anodes 6 are coated with luminescent material layers 7. The electrons emitted from the microtips 2' strike the material layers 7, thereby emitting light.

FIG. 2 is a sectional view of a conventional FED employing a mesh grid. Similarly to the FED of FIG. 1, the conventional FED of FIG. 2 includes transparent front and rear substrates 15 and 11 with a spacer 18 therebetween for separating the front and rear substrates 15 and 11 by a predetermined gap. Cathodes 12 formed in a striped pattern, an insulating layer 13, and gates 14 formed in a striped pattern crossing the cathodes 12 are sequentially provided on the rear substrate 11. Holes 13' are formed in the insulating layer 13 on the cathodes 12. Microtips 12' are formed on the cathodes 12 exposed by the holes 13'. The gates 14 are provided with opening portions 14' corresponding to the holes 13'. The anodes 16 are formed on the surface of the front substrate 15 facing the rear substrate 11 in a striped pattern crossing the cathodes 12. The anodes 16 are coated with luminescent material layers 17. The FED of FIG. 2 also includes a metal mesh grid 19, which controls electrons emitted from the microtips 12', between the gates 14 and the anodes 16.

In manufacturing triode FEDs without using a photolithography method, a mesh coated with an electrode may be used as a gate electrode. However, when a mesh structure is provided to a FED panel which is formed of glass and has a high vacuum inner side, mechanical stress increases, and thus a spacer may be warped while a front substrate and a rear substrate are sealed, or the front and rear substrates may be broken due to atmospheric pressure during vacuum exhaust. In other words, since a mesh structure and a spacer are integrally formed in a conventional FED, warp of the mesh structure due to thermal expansion or gas flow horizontally presses the spacer. Accordingly, the spacer which is resistant to a vertical pressure but weak to a horizontal pressure diverges from an originally designed position or is warped, and thus it may eventually break due to a vertical atmospheric pressure. This makes it very difficult to manufacture FED panels.

SUMMARY OF THE INVENTION

To solve the above problem, an object of the present invention is to provide a triode carbon nanotube field emission display (FED) using a barrier rib structure and a manufacturing method thereof, for preventing damage or warping due to thermal expansion of a mesh structure by forming barriers on a cathode pattern using a screen printing method and mounting the mesh structure on the barriers to stably fix the mesh structure and a spacer within a panel.

To achieve the above object, the present invention provides a carbon nanotube FED including front and rear substrates disposed to face each other and be separated by a predetermined gap, cathodes formed on the rear substrate in a striped pattern, barrier ribs formed on the cathodes to a predetermined thickness at predetermined intervals so as to expose the cathodes at predetermined intervals, carbon nanotubes formed on the cathodes exposed by the barrier ribs, for the emission of electrons, a mesh structure mounted on the barrier ribs, which includes opening portions for passing electrons emitted from the carbon nanotubes and slots in a region corresponding to gaps between the barrier ribs, spacers for keeping a predetermined gap between the front and rear substrates, each of the spacers being shaped into a rugged bar having protrusions which are inserted between the barrier ribs through the slots, anodes formed on the front substrate in a striped pattern crossing the cathodes, and luminescent material layers deposited on the anodes.

Each of the barrier ribs is formed between portions at which the cathodes and anodes cross to a thickness of 10–100 $\mu$m. The barrier ribs are formed in a region corresponding to the black matrix of the anodes. The mesh structure is formed of an insulator, and gates are formed on the mesh structure in a striped pattern crossing the cathodes.

The mesh structure may be formed of a conductive material to be wired as a common electrode. The size of each opening portion of the mesh structure is determined in accordance with the area of a portion at which each cathode and each anode cross. The width of each protrusion of the spacer toward the cathodes is narrower than the gap between the barrier ribs by 5–10 $\mu$m.

To achieve the above object, the present invention provides a method for manufacturing a carbon nanotube field emission display including front and rear substrates disposed to face each other and be separated by a predetermined gap, cathodes formed on the rear substrate in the pattern of stripes, barrier ribs formed on the cathodes to a predetermined thickness at predetermined intervals so as to expose the cathodes at predetermined intervals, carbon nanotubes formed on the cathodes exposed by the barrier ribs, for the emission of electrons. a mesh structure mounted on the barrier ribs, which includes opening portions for passing electrons emitted from the carbon nanotubes and slots in a region corresponding to gaps between the barrier ribs, spacers for maintaining a predetermined gap between the front and rear substrates, each of the spacers being shaped into a rugged bar having protrusions which are inserted between the barrier ribs through the slots, anodes formed on the front substrate in a striped pattern crossing the cathodes, and luminescent material layers deposited on the anodes. The method includes the steps of (a) forming the barrier ribs on the rear substrate having the cathodes in a striped pattern, (b) depositing the carbon nanotubes on the cathodes between the barrier ribs to form electron emission sources, (c) mounting the mesh structure on the barrier ribs, (d) inserting the spacers between the barrier ribs through the slots of the mesh structure, and (e) mounting the front substrate having the anodes coated with the luminescent material layers on the spacers such that the anodes are accurately aligned and performing a sealing process.

In the step (a), each of the barrier ribs is formed to a thickness of 10–100 μm. The step (b) is performed by one of a screen printing method, a chemical vapor deposition method, an electrophoretic method and an anodized alumina sheet cathode method. In the step (c), the mesh structure is formed of an insulator, and the step (c) includes the step of forming gates on the mesh structure in a striped pattern crossing the cathodes. The mesh structure may be formed of a conductive material. In the step (c), the size of each opening portion of the mesh structure is determined in accordance with the area of a portion at which each cathode and each anode cross. In the step (d), the width of each protrusion of the spacer toward the cathodes is narrower than the gap between the barrier ribs by 5–10 μm. The barrier ribs, the opening portions and slots of the mesh structure and the protrusions of the spacers are designed such that the front substrate, the mesh structure and the spacers are assembled by self-alignment.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
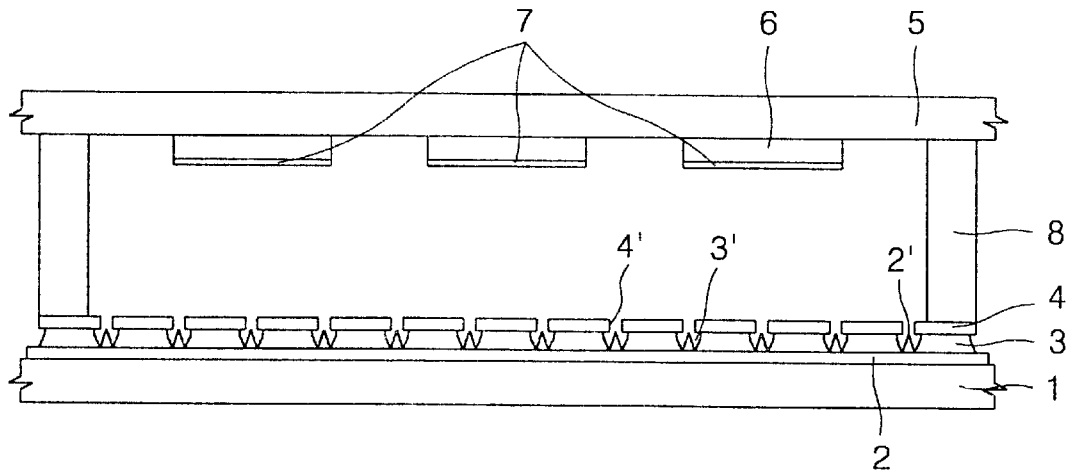
FIG. 1 is a sectional view of a conventional field emission display (FED)
Figure 2:
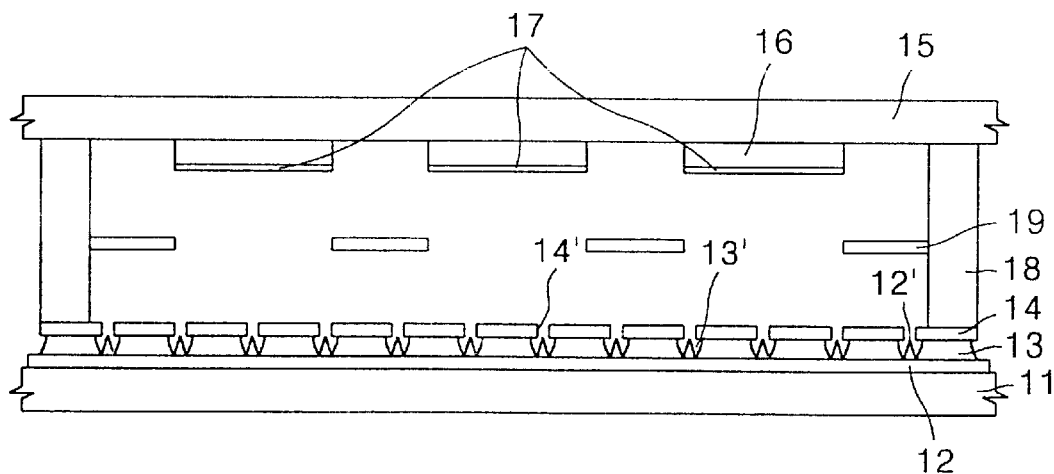
FIG. 2 is a sectional view of a conventional FED employing a mesh grid.
Figure 3:
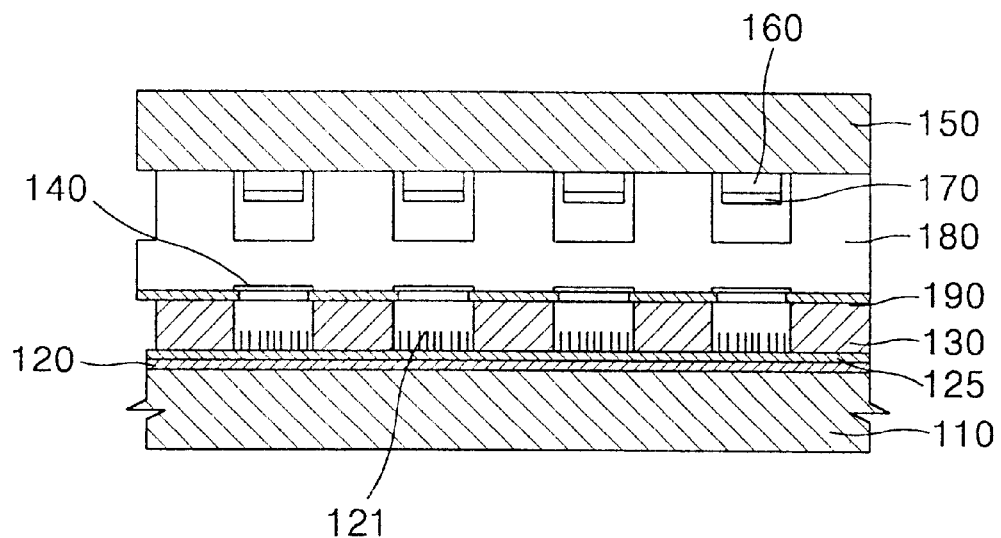
FIG. 3 is a vertical sectional view of a FED employing a barrier rib structure according to the present invention.
Figure 4:
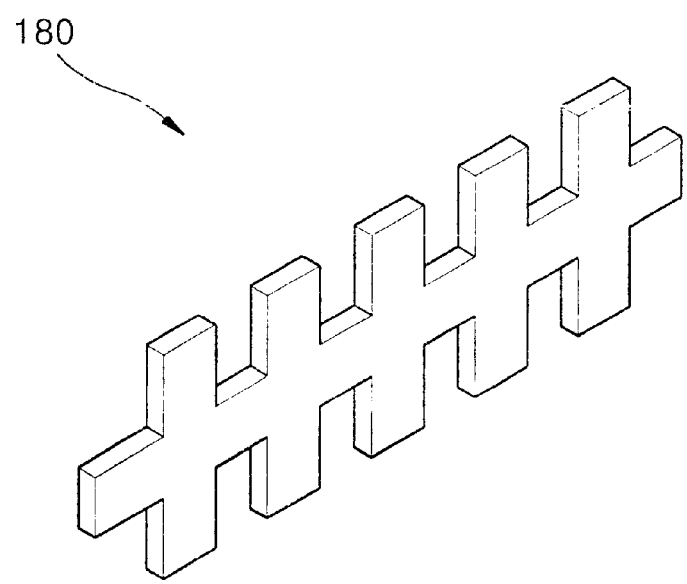
FIG. 4 is a detailed perspective view showing the structure of the spacer of FIG. 3.
Figure 5:
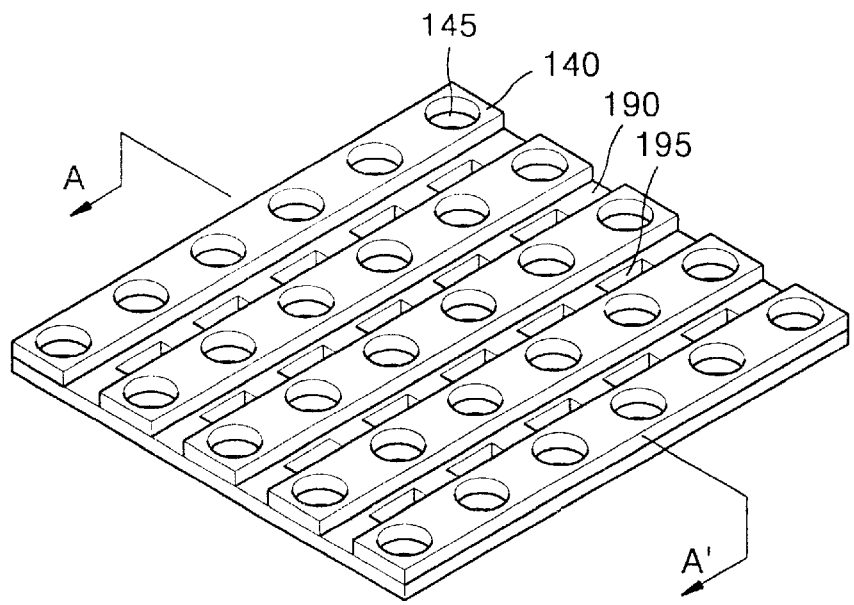
FIG. 5 is a detailed perspective view showing the structure of the mesh structure of FIG. 3.

Referring to FIGS. 3 through 5, a triode carbon nanotube field emission display (FED) employing a barrier rib structure includes transparent front and rear substrates 150 and 110 with a spacer 180 therebetween for separating the front and rear substrates 150 and 110 by a predetermined gap. Cathodes 120 are formed on the rear substrate 110 in a striped pattern. A resistance layer 125 is formed on the cathodes 120. Barrier ribs 130 are formed on the resistance layer 125 for disposing carbon nanotubes 121 for electron emission and a mesh structure 190 at predetermined intervals. Gates 140 are formed on the mesh structure 190 in a striped pattern crossing the cathodes 120. Dot-shaped opening portions 145 are formed on the mesh structure 190 on which the gates 145 corresponding to the carbon nanotubes 121 are formed in a striped pattern, thereby allowing the electrons emitted from the carbon nanotubes 121 to proceed toward anodes 170. Slots 195 in which the protrusions of the spacer 180 of FIG. 4 are inserted are formed on the mesh structure 190 in which gate 140 lines are not formed. The anodes 160 are formed on the surface of the front substrate 150 facing the rear substrate 110 in a striped pattern crossing the cathodes 120. Luminescent material layers 170 are formed on the anodes 160.

The present invention is characterized in that the barrier ribs 130, for supporting the mesh structure 190 to be apart from the rear substrate 110 by a predetermined gap and controlling the horizontal movement of the spacer 180 as shown in FIG. 4, are deposited on the rear substrate 110 using a thick film forming process, the mesh structure 190 is mounted to the barrier ribs 130 without using additional adhesives, and the protrusions of the spacer 180 inserted into the mesh structure 190 through the slots 195 are inserted into the barrier ribs 130 so as to prevent the horizontal movement of the spacer 180.

Referring to FIG. 5, the mesh structure 190 is formed of a non-conductive insulator. The gate 140 lines are formed on the mesh structure 190 in a striped pattern. The size of each dot-shaped opening portion 145 is determined by the size of a dot at which each cathode 120 and each anode 160 cross. The mesh structure 190 is provided with the slots 195 in which the protrusions of the spacer 180 are inserted. The spacer 180 is formed of a material usually used for forming a FED spacer. As shown in FIG. 4, the spacer 180 has protrusions at the upper and lower portions thereof. The shapes of the protrusions toward the cathodes 120 are formed to pass through the slots 195 of the mesh structure 190 and to be tightly inserted into the barrier ribs 130. In this case, each protrusion is formed such that the width of the protrusion has a small tolerance (about 5–10 μm) with respect to the distance between the barrier ribs 130 to allow the horizontal movement of the spacer 180 a little, thereby reducing stress during a sealing or exhausting process. The shapes of the protrusions toward the anodes 160 are formed employing the structure of a conventional FED spacer formed not to interfere with the luminescent material layers 170.

Figure 6:
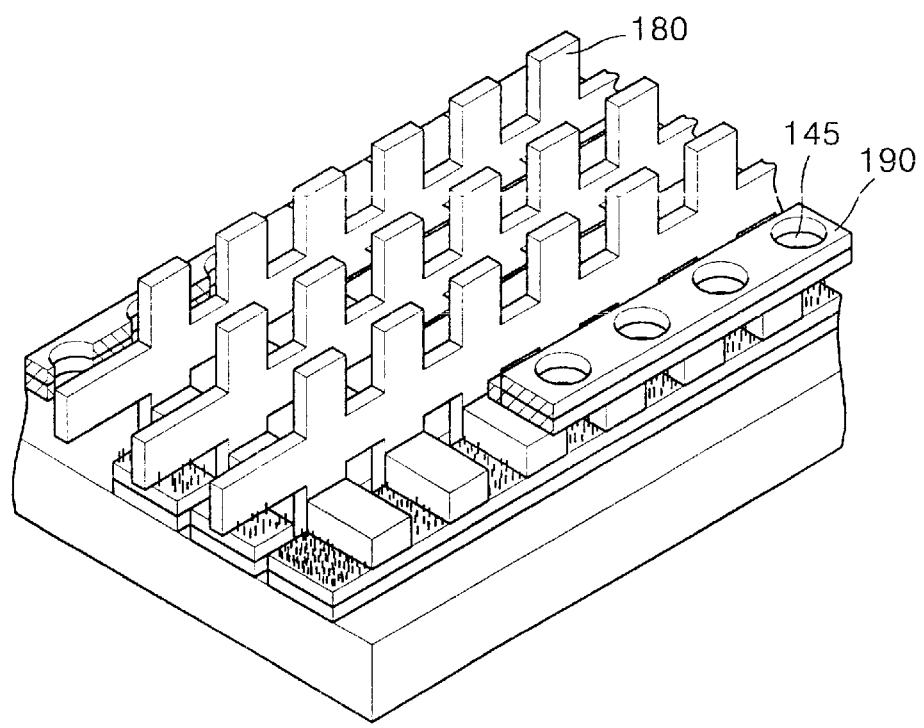
FIG. 6 is a cutaway perspective view of the FED of FIG. 3 in which the mesh structure and the spacer are coupled to the rear substrate.

FIG. 6 is a perspective view showing a structure in which the spacer 180 and the mesh structure 190 are coupled to the rear substrate 110 having the cathodes 120, the carbon nanotubes 121 and the barrier ribs 130 of FIG. 3. A sectional view of FIG. 6 taken along the line A–A' is shown through the gate 140 and the mesh structure 190 in FIG. 3. A FED according to the present invention is completed by coupling a front substrate having anodes and luminescent material layers to the structure of FIG. 6. A method of manufacturing the FED of the present invention will now be described below.

Figure 7A:
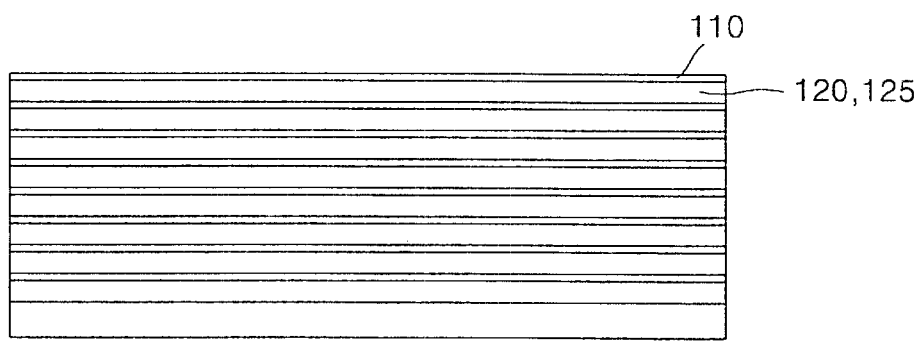
FIGS. 7A through 11B are plan and sectional views for showing the steps of manufacturing the FED of FIG. 3.
Figure 7B:
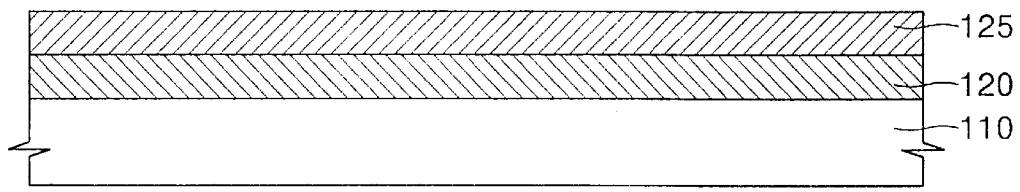
Figure 8A:
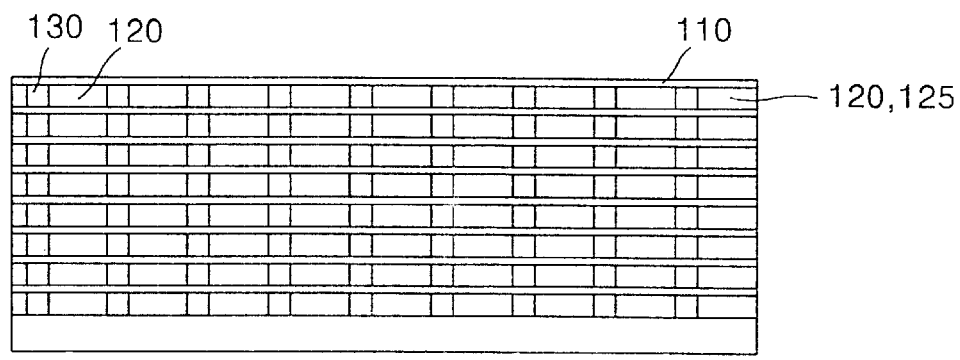
Figure 8B:
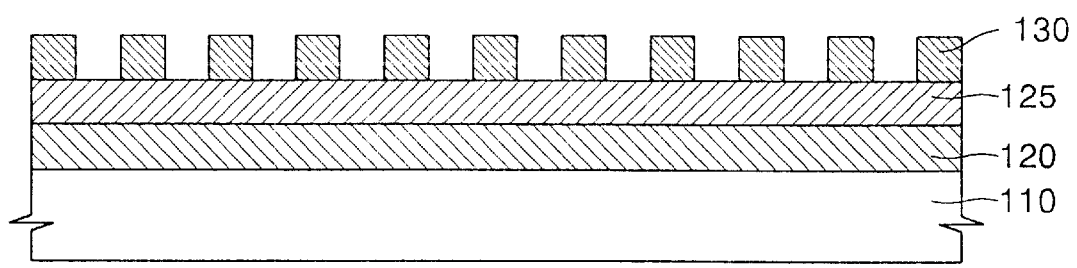

Primarily, barrier ribs 130 as shown in FIGS. 8A and 8B are printed on a rear substrate 110 having cathodes 120 in a striped pattern and resistance layers 125, as shown in FIGS. 7A and 7B to a thickness of 20–40 μm using a thick film forming process, and then a firing process is performed on the printed barrier ribs 130. The barrier ribs 130 are formed on the resistance layer 125, and each gap therebetween corresponds to a dot at which a cathode and an anode cross according to the resolution of a display panel.

Figure 9A:
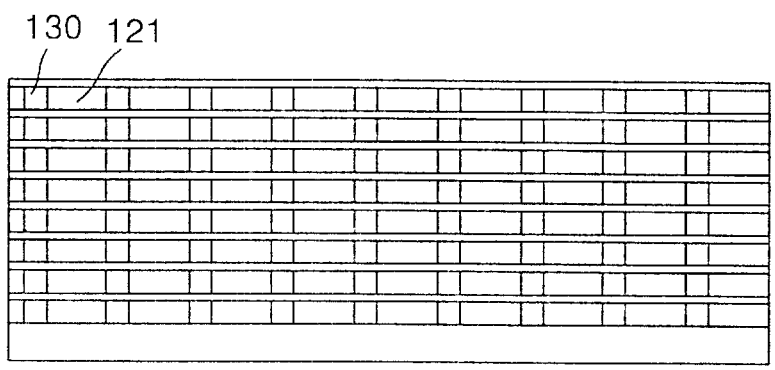
Figure 9B:
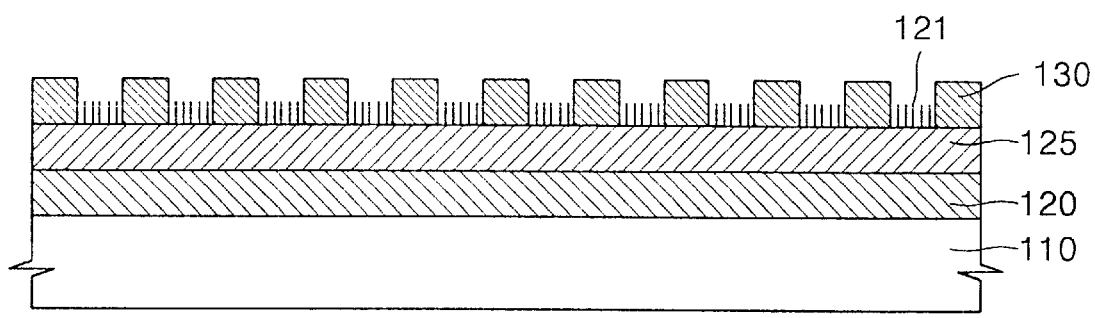

Next, as shown in FIGS. 9A and 9B, carbon nanotubes 121 are deposited on the resistance layer 125 between the barrier ribs 130 to form electron emission sources, thereby completing work for improving an electron emission characteristic. Carbon nanotubes 121 may be deposited by a screen printing method, a chemical vapor deposition method, an electrophoretic method or an anodic oxidation alumina sheet cathode method. The deposition of the carbon nanotubes 121 will later be described in detail with reference to FIGS. 12 through 15C.

Figure 10A:
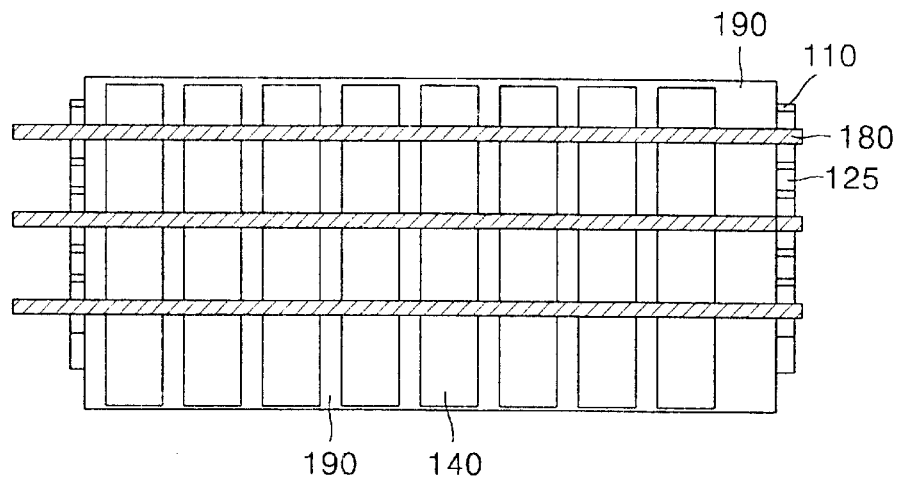
Figure 10B:
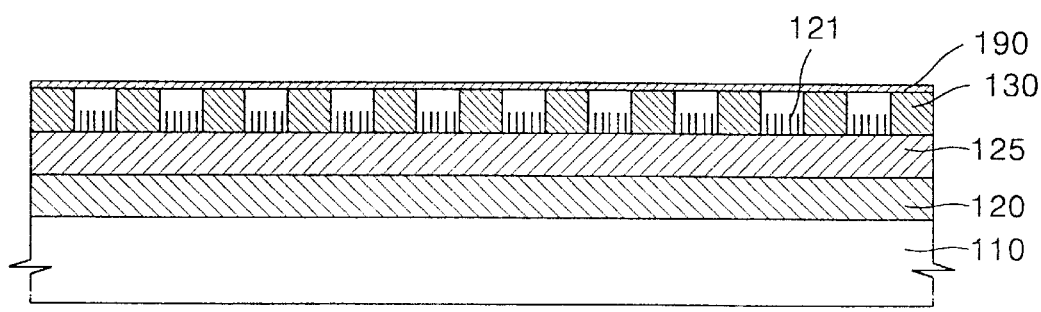
Figure 10C:
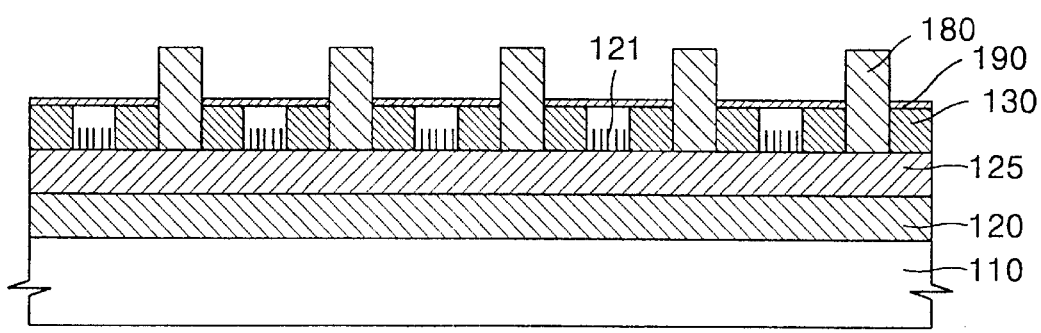

Next, as shown in FIGS. 10A and 10B, a mesh structure 190 on which gates 140 are formed in a striped pattern is mounted to the barrier ribs 130 such that the gate 140 lines on the mesh structure 190 perpendicularly cross the cathode lines to allow addressing later. Subsequently, as shown in FIGS. 10A and 10C, spacers 180 are inserted between the barrier ribs 130 through slots 195 of the mesh structure 190. As a result, self-alignment among the cathode 120 line, the mesh structure 190 and the spacers 180 are achieved. Accordingly, precise alignment between the mesh structure 190 and the cathode line 120 is not necessary. The size of each slot 195 of the mesh structure 190 is determined in accordance with the size of a portion at which a cathode and an anode cross. It is preferable that the slots 195 through which the protrusions of the spacers 180 are inserted in the mesh structure 190 are previously formed.

Figure 11A:
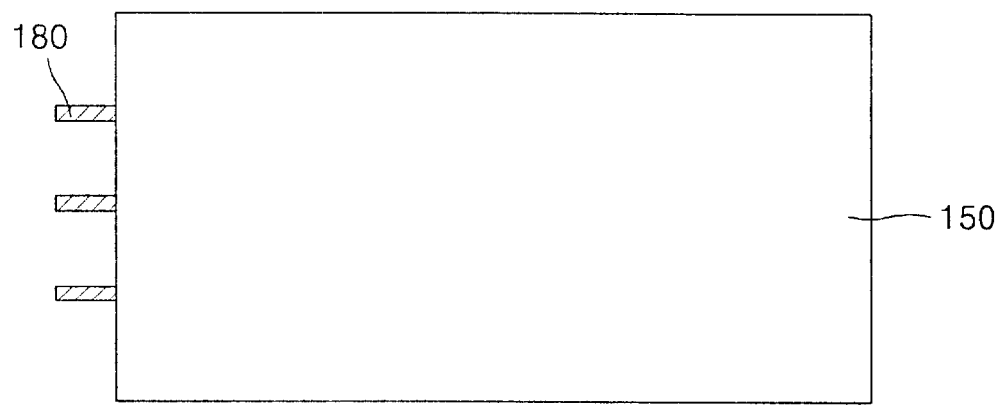
Figure 11B:
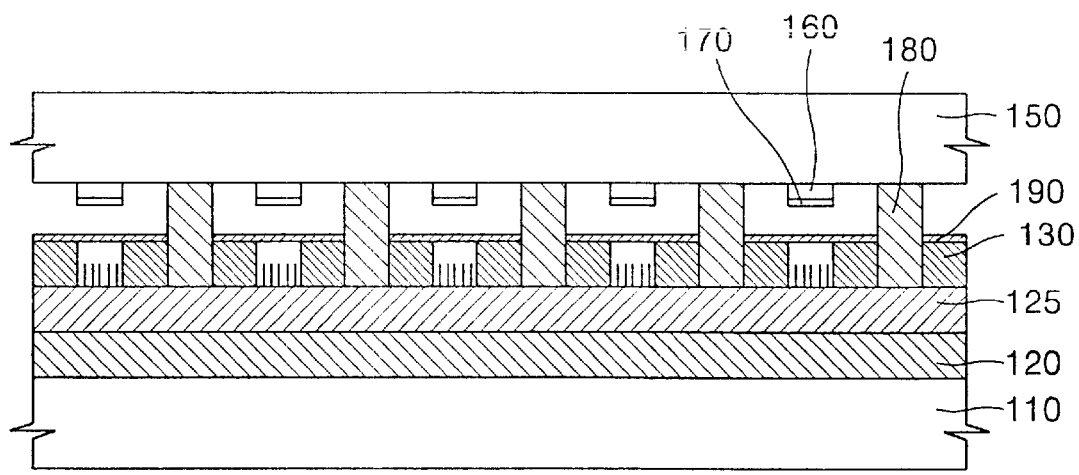

Next, as shown in FIGS. 11A and 11B, a front substrate 150 is mounted and fixed to the spacers 180 with a clip such that anodes 160 coated with luminescent material layers 170 can be accurately aligned, and then a sealing process is performed to complete the FED.

The following description concerns a method of depositing carbon nanotubes.

Figure 12:
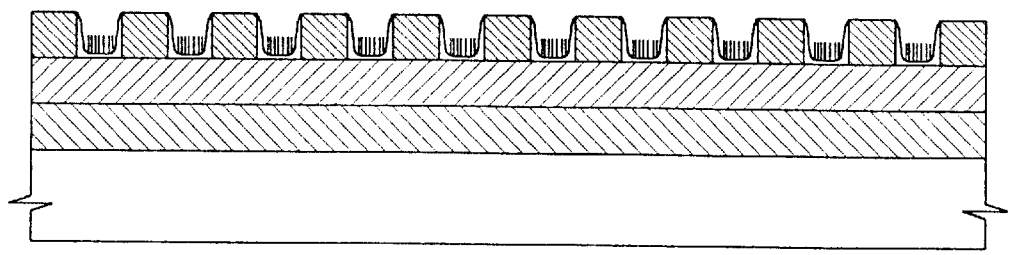
FIGS. 12 through 15C are views for explaining a method of depositing a carbon nanotube in the FED of FIG. 3.
Figure 13A:
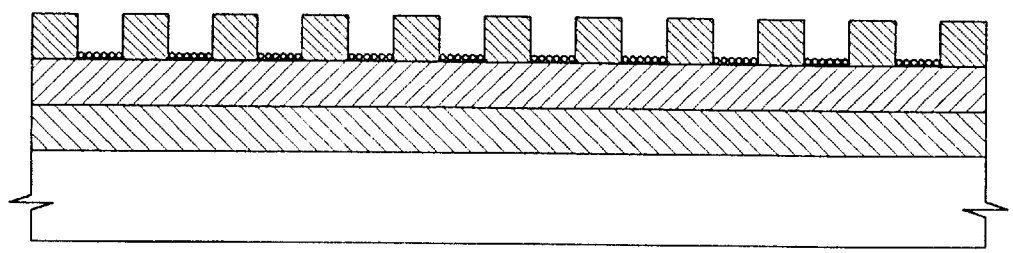
Figure 13B:
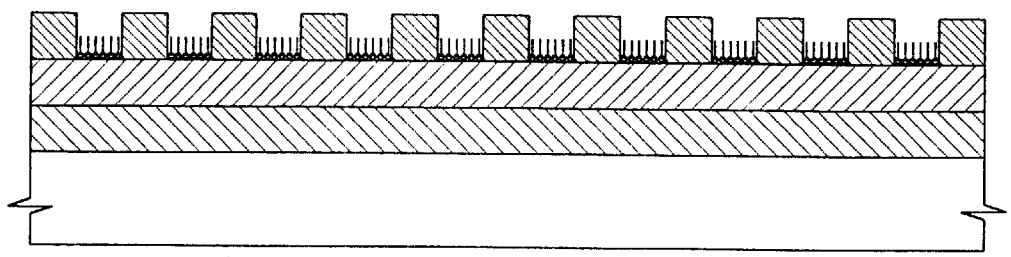
Figure 14A:
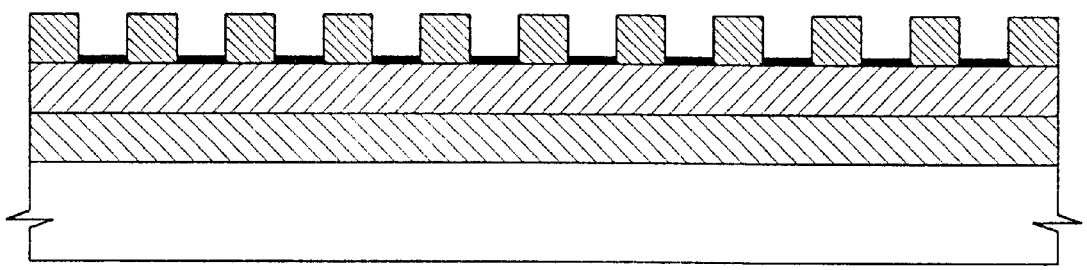
Figure 14B:
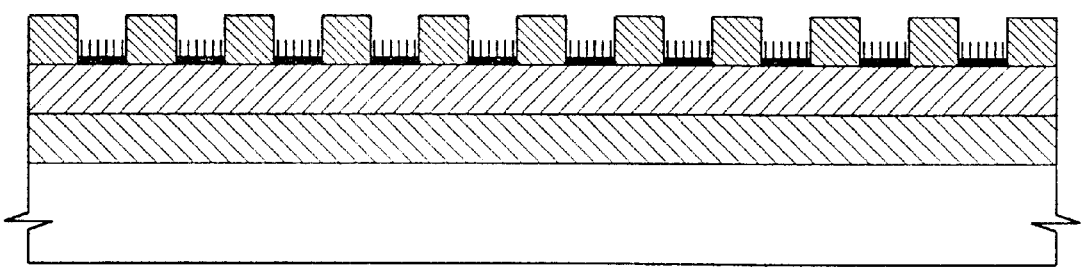
Figure 15A:
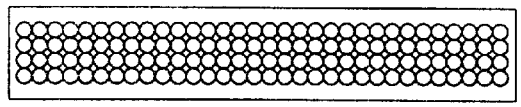
Figure 15B:
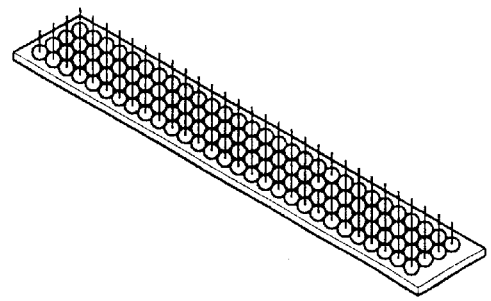
Figure 15C:
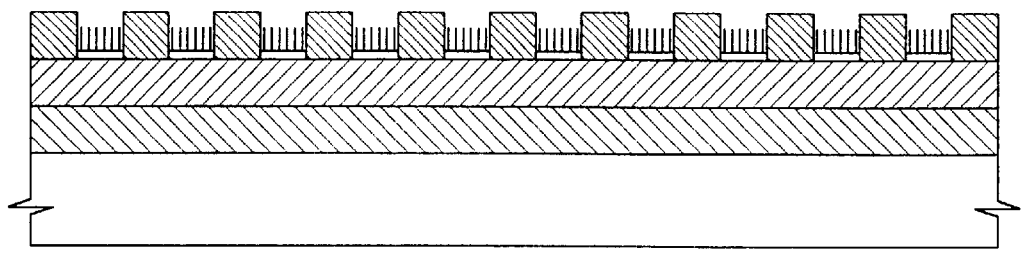

1. When using a screen printing method, as shown in FIG. 12, paste containing carbon nanotubes are screen-printed on a resistance layer of a substrate having barrier ribs and then plasticized.
2. When using a chemical vapor deposition method, as shown in FIG. 13A, a seed layer is formed on a resistance layer of a substrate having barrier ribs using a laser interferometeric lithography method. Next, as shown in FIG. 13B, carbon nanotubes are grown from the seed layer by the chemical vapor deposition method.
3. When using an electrophoretic method, as shown in FIG. 14A, an electrode is formed on a resistance layer of a substrate having barrier ribs. Then, as shown in FIG. 14B, carbon nanotubes are adhered to the resultant structure by applying a voltage to the electrode after putting the resultant structure in a colloidal solution containing the carbon nanotubes.
4. When using an anodized alumina sheet cathode method, carbon nanotubes are grown from an anodized porous alumina sheet of FIG. 5A using a chemical vapor deposition, as shown in FIG. 5B, while forming a back contact electrode. As shown in FIG. 5C, the anodic alumina sheet is physically inserted between barrier ribs on a resistance layer.

In a triode carbon nanotube FED employing barrier ribs according to the present invention, barrier ribs are formed on cathode lines by a screen printing method, a mesh structure is mounted on the barrier ribs, and a spacer is inserted between the barrier ribs through slots of the mesh structure, thereby stably fixing the mesh structure and the spacer within a FED panel due to support by the barrier ribs. Accordingly, the barrier ribs prevent the spacer from being moved, thereby preventing distortion of an image. In addition, the present invention has the following advantages.

First, the present invention prevents warping of the spacer caused by thermal expansion of the mesh structure, thereby effectively handling vertical pressure. Second, since the mesh structure and the spacer are designed to take into account the structure of cathodes and anodes, alignment of the mesh structure and the spacer with the cathodes and anodes is not necessary. Third, carbon nanotubes may be formed on a rear substrate using a chemical vapor deposition method, a screen printing method, electrophoretic method or anodized alumina method. Fourth, conventional methods of coupling the mesh structure to the electrode, forming the barrier ribs and forming carbon nanotubes can be adopted in the present invention. Fifth, the spacer can be disposed not to interfere with the flow of gas. Finally, a triode carbon nanotube FED of the present invention is more effective than a conventional triode FED.

The present invention has been described by way of exemplary embodiments to which it is not limited. Variations and modifications will occur to those skilled in the art without departing from the scope of the invention as set out in the following claims.

What is claimed is:

1. A carbon nanotube field emission display (FED) comprising:

front and rear substrates disposed to face each other and be separated by a predetermined gap;

cathodes formed on the rear substrate in a striped pattern;

barrier ribs formed on the cathodes to a predetermined thickness at predetermined intervals so as to expose the cathodes at predetermined intervals;

carbon nanotubes formed on the cathodes exposed by the barrier ribs, for the emission of electrons;

a mesh structure mounted on the barrier ribs, the mesh structure comprising opening portions for passing electrons emitted from the carbon nanotubes and slots in a region corresponding to gaps between the barrier ribs;

spacers for keeping a predetermined gap between the front and rear substrates, each of the spacers being shaped into a rugged bar having protrusions and the protrusions being inserted between the barrier ribs through the slots;

anodes formed on the front substrate in a striped pattern crossing the cathodes; and luminescent material layers deposited on the anodes.

2. The carbon nanotube field emission display of claim 1, wherein each of the barrier ribs is formed to a thickness of 10–100 $\mu$m.

3. The carbon nanotube field emission display of claim 1, wherein the barrier ribs are formed between portions at which the cathodes and anodes cross.

4. The carbon nanotube field emission display of claim 1, wherein the barrier ribs are formed in a region corresponding to the black matrix of the anodes.

5. The carbon nanotube field emission display of claim 1, wherein the mesh structure is formed of an insulator, and gates are formed on the mesh structure in a striped pattern crossing the cathodes.

6. The carbon nanotube field emission display of claim 1, wherein the mesh structure is formed of a conductive material to be wired as a common electrode.

7. The carbon nanotube field emission display of claim 1, wherein the size of each opening portion of the mesh structure is determined in accordance with the area of a portion at which each cathode and each anode cross.

8. The carbon nanotube field emission display of claim 1, wherein the width of each protrusion of the spacer toward the cathodes is narrower than the gap between the barrier ribs by 5–10 $\mu$m.

* * * * *